(12) United States Patent
Anderson

(10) Patent No.: US 6,684,536 B2
(45) Date of Patent: Feb. 3, 2004

(54) SEA GRASS SLAB PLANTER AND RELATED PROCESS

(76) Inventor: James F. Anderson, 3941 24th St. SE., Ruskin, FL (US) 33570

( * ) Notice: Subject to any disclaimer, the term of this patent is extended or adjusted under 35 U.S.C. 154(b) by 42 days.

(21) Appl. No.: 10/077,399

(22) Filed: Feb. 15, 2002

(65) Prior Publication Data

US 2003/0019131 A1 Jan. 30, 2003

Related U.S. Application Data

(60) Provisional application No. 60/307,483, filed on Jul. 24, 2001.

(51) Int. Cl.$^7$ ................................................. E02F 3/34
(52) U.S. Cl. ......................................... 37/340; 111/100
(58) Field of Search ........................ 37/184, 185, 186, 37/187, 188, 461, 195, 307, 314, 340, 341; 111/100–104; 294/68.23

(56) References Cited

U.S. PATENT DOCUMENTS

| 263,230 A | * | 8/1882 | Sargent ........................ 37/340 |
| 501,122 A | | 7/1893 | Walsh |
| 827,635 A | | 7/1906 | Howe |
| 1,864,793 A | | 6/1932 | Botten |
| 2,280,547 A | | 4/1942 | Scofield ........................ 114/52 |
| 2,355,086 A | | 8/1944 | Lane ............................ 294/66 |
| 2,621,428 A | | 12/1952 | Billings ........................ 37/187 |
| 3,017,719 A | | 1/1962 | Sieler ............................ 47/58 |
| 3,036,393 A | | 5/1962 | Baird ........................... 37/184 |
| 3,523,380 A | | 8/1970 | Bolyard ........................ 37/141 |
| 3,885,440 A | | 5/1975 | Rossfelder ................. 73/425.2 |
| 4,104,975 A | | 8/1978 | Ingram et al. .................. 111/3 |
| 4,150,503 A | * | 4/1979 | Lespinasse .................... 37/309 |
| 4,265,036 A | | 5/1981 | Staats ........................... 37/71 |
| 4,373,278 A | | 2/1983 | Myrick .......................... 37/71 |
| 4,542,929 A | | 9/1985 | Possinger ..................... 294/88 |
| 4,778,211 A | | 10/1988 | Gabriel ........................ 294/115 |
| 4,908,966 A | | 3/1990 | Phillips ......................... 37/71 |
| 5,199,194 A | | 4/1993 | Scott ........................... 37/340 |
| 5,443,294 A | | 8/1995 | Prinz ........................ 294/68.23 |
| 5,472,249 A | | 12/1995 | Fiedler .......................... 294/2 |
| 5,561,922 A | * | 10/1996 | Lynch .......................... 37/317 |
| 5,715,614 A | | 2/1998 | Ookuwa ....................... 37/302 |
| 5,836,089 A | | 11/1998 | Lipsker ........................ 37/186 |
| 6,073,563 A | | 6/2000 | Cox ............................ 111/100 |

* cited by examiner

Primary Examiner—Robert E. Pezzuto
(74) Attorney, Agent, or Firm—Donald R. Bahr

(57) ABSTRACT

The planting of individual sea grass plants or small bunches of sea grass plants is known in the prior art. In the prior art these plantings are made either manually or with appropriate machinery. This invention deals with the digging, transporting and planting of large slabs of sea grass. The process comprises the steps of digging a slab of sea grass, transporting the slab of sea grass to a new location, digging a furrow with the same apparatus that is used to dig the slab of sea grass and depositing the slab of sea grass in the furrow.

17 Claims, 4 Drawing Sheets

SEA GRASS SLAB PLANTER AND RELATED PROCESS

RELATED APPLICATIONS

This application claims priority of provisional application Ser. No. 60/307,483 filed Jul. 24, 2001.

BACKGROUND

This invention is concerned with a process and related apparatus whereby aquatic plants may be planted underwater for purposes of restoration. The restoration of all aspects of the environment has become extremely important in recent years. The three areas of restoration which are of primary importance are reducing air pollution, restoring and cleaning up the land and cleaning up and restoring our waterways, the ocean and related estuaries. It is these related estuaries that are the primary thrust of the subject invention.

As a result of the decrease in water quality millions of acres of aquatic plant life, which form an important part of the aquatic eco system have been destroyed. That is because of a decrease in water quality, in other words pollution, aquatic plant life has been destroyed. In most cases this destruction has been gradual over a long period of years however in some instances it can be rapid, for example as a result of a shipwreck.

Because aquatic plant life is an important part of the complex aquatic environment the restoration of this plant life is of primary importance.

The natural restoration of aquatic plant life is an extremely slow process. While it is possible to manually plant shoots of aquatic plants, due to the cost of labor the manual planting of sea grass plants is at best marginally successful. Due to the difficulty of manually planting shoots of aquatic plants the cost of manually planting just one acre of an estuary can cost many tens of thousands of dollars. Further manual planting in some instances is of questionable success as the person doing the planting, in walking over the bottom of an estuary does further damage by crushing other plants which may be growing in the area.

This invention is concerned with a process and apparatus whereby sea grass can be quickly planted in an economical fashion.

As used in connection with this invention the term aquatic plant life and sea grass includes many species of plant life such as halodule, wrightii (shoal grass), thalassia (turtle grass) etc.

Aquatic plant life as it exists in estuaries is important in preventing water pollution as this plant life acts as a filter for many pollutants and hence this plant life helps to maintain water quality.

The restoration of aquatic life to the bottom of our estuaries is extremely important as this aquatic plant life plays a critical function in the total marine eco system. A large number of important marine animals, both warm and cold blooded, rely totally or in part on this aquatic plant life for a breeding area, for cover, for food etc. for example the endangered manatee relies solely on sea grass as its food source.

OBJECTS

The primary object of this invention is a process whereby aquatic plant life may be dug, repositioned on and replanted on the bottom of an estuary.

Still another object is related apparatus whereby this planting may be effected with minimal damage to the bottom of the estuary.

Still another object of this invention is apparatus whereby large slabs of aquatic plants may be planted on the bottom of an estuary.

Another object if a sea grass planter which automatically makes a furrow for the planting of a slab of sea grass.

BRIEF DESCRIPTION OF THE INVENTION

The subject invention relates to a process for planting aquatic plants such as a wide variety of sea grass. The invention is also concerned with apparatus whereby large slabs of aquatic plants may be dug, transplanted and planted in accordance with this invention. The planting of these slabs of sea grass is to be contrasted with the prior art wherein individual plants or small bunches of plants are planted with a tree spade.

The process of this invention in its broadest terms comprises the digging and positioning of a slab of sea grass at a new location wherein a furrow is automatically formed.

As is shown in U.S. Pat. No. 6,070,537 issued Jun. 6, 2000, individual aquatic plants may be planted. While the planting of these plants is highly successful it is not feasible to use the process and apparatus to plant large areas of sea grass if continuous coverages of large areas is desired on a short term basis. By use of the process and apparatus of the U.S. Pat. No. 6,070,537 continuous coverage can be achieved only over an extended period of time. That is in order to achieve continuous coverage the individual plants as are planted by the process of U.S. Pat. No. 6,070,537 must grow and multiply in order to effect continuous coverage. This growing process takes an extended period of time.

In contrast to planting individual plants the process and apparatus of this invention picks up large slabs of aquatic plants, transports the slabs to a new location and plants the slabs. The replanted slabs contain thousands of individual aquatic plants. The process and apparatus of this invention is advantageous in that a furrow to replant the sea grass slab is automatically formed by the same apparatus which digs the slab.

DESCRIPTION OF THE PREFERRED EMBODIMENT

Figure 1:
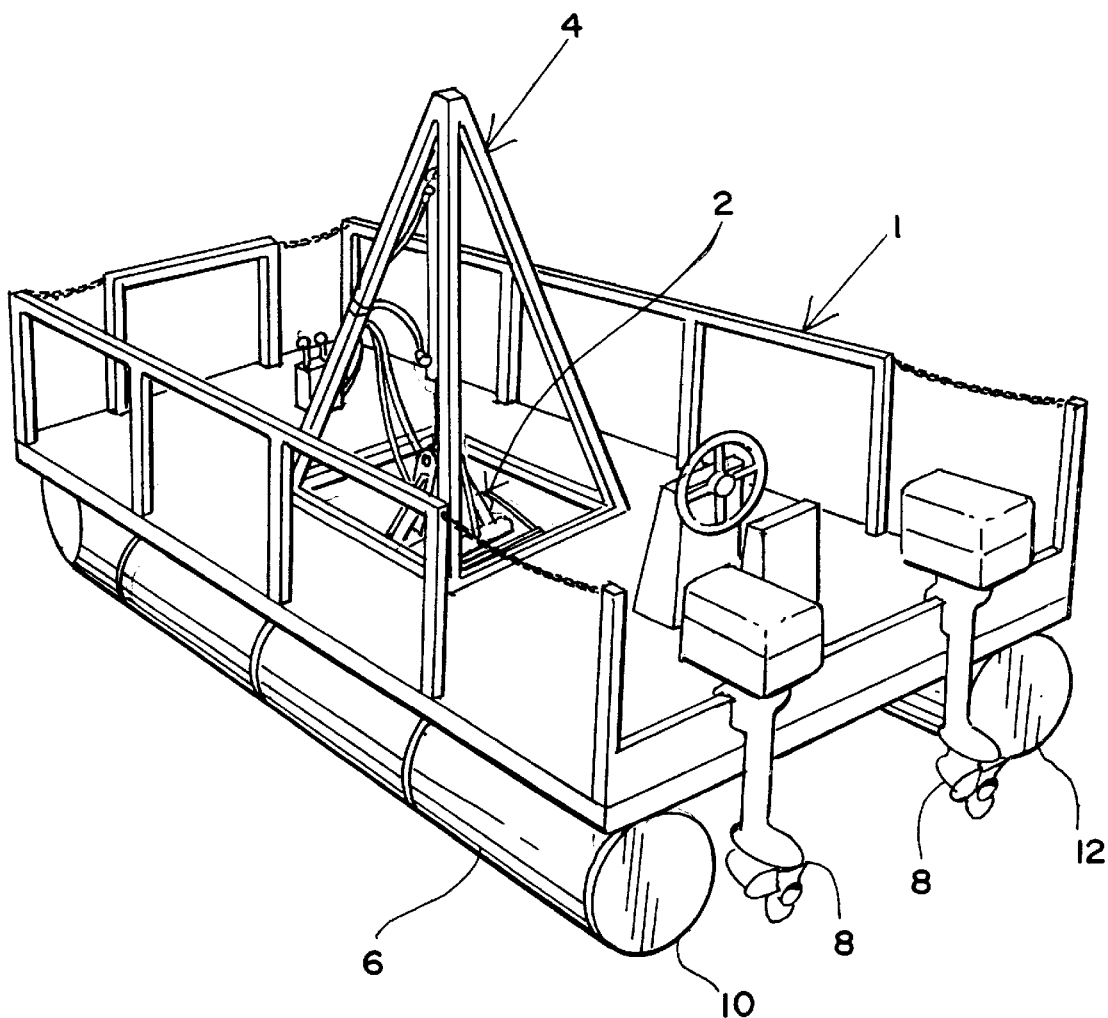
FIG. 1 is a perspective view showing the sea grass planter on its floating platform.

Referring to FIG. 1 it can be seen that the composite apparatus of this invention comprises a hull 6 and a sea grass slab digger/planter 2 which is supported by support 4. Hull 6 is illustrated as a bihull which is preferred as this design permits digger/planter 2 to be located between hull segments 10 and 12. As a result of this arrangement the digging and planting of sea grass slabs can be effected through hull 6. Further because of the central location of digger/planter 2 a stable platform is provided for. The composite structure may be powered by any suitable power source such as a pair of outboard motors 8 as is illustrated.

In operation hull 6 is positioned over the section of the estuary bottom where the sea grass slab is to be dug. Digger/planter 2 is then used to dig a slab of sea grass contained therein. Outboard motors 8 are then used to move the composite structure to the area where the sea grass slab is to be planted. Digger/planter 2 is then lowered to thre estuary bottom and a forrow is dug by digger/planter 2 and the slab of sea grass deposited in the furrow. The process whereby the slab of sea grass is dug, transported and planted will be described in detail herein below.

Figure 2:
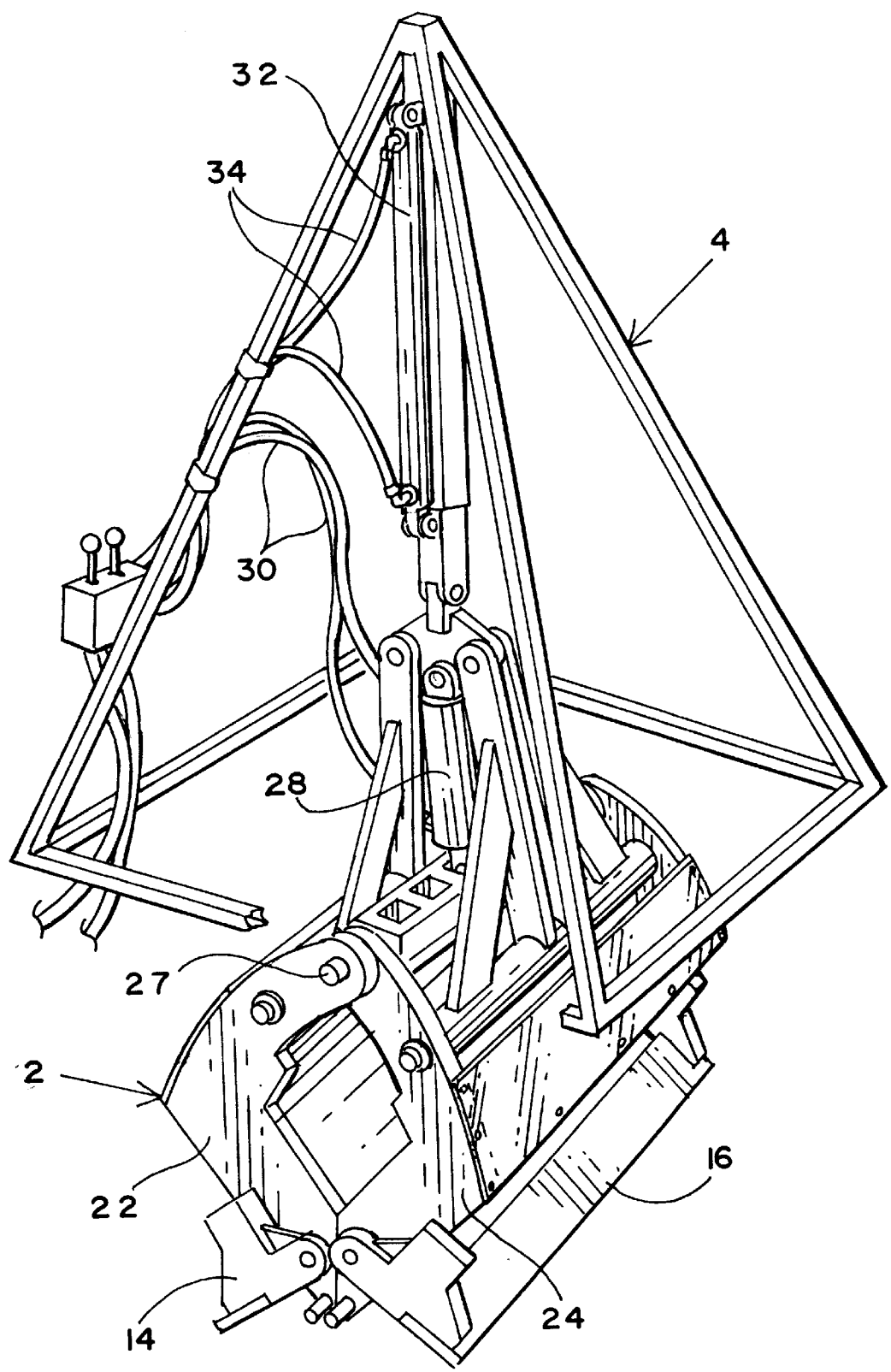
FIG. 2 is a cutaway perspective view showing the sea grass planter and its support.

Referring to FIG. 2 it can be seen that digger/planter 2 is supported on a pyramid shaped support 4. It is understood by one skilled in the art that support 4 can assume any convenient shape.

Digger/planter 2 incorporates a pair of primary jaws 22 and 24 and a pair of secondary jaws 14 and 16. Primary jaws 22 and 24 are used to dig the slab of sea grass which is to be transplanted. Secondary jaws 14 and 16 are used to dig the furrow into which the sea grass slab is to planted. Throughout this application when the term sea grass is used this term relates to a section of the estuary bottom i.e. sand, soil, organic matter and the living sea grass plants which are growing therein. The size of these slabs is controlled by the dimensions of primary jaws 22 and 24. The sea grass slabs in accordance with this invention can be of any convenient size, a preferred size for use with the process and apparatus of this invention is four by five feet.

Primary jaws 22 and 24 of planter/digger 2 are pivotally connected to each other via pivot pin 27. Power to open and close primary jaws 22 and 24 is provided by hydraulic cylinder 28 which is in turn supplied with hydraulic power via hydraulic lines 3.

The vertical movement of digger/planter 2 is controlled by hydraulic cylinder 32 which is in turn supplied with hydraulic power by hydraulic lines 34.

The sequence of the digging and planting cycle in accordance with this invention is illustrated in FIGS. 3–6.

In the initial sequence of the planting cycle in accordance with the process of this invention primary jaws 22 and 24 are opened by the action of hydraulic cylinder 28. As is shown in FIG. 3 digger/planter 2 is then lowered in the direction of arrow 36.

The weight of digger/planter 2 is usually sufficient to cause the leading edges 38 and 40 of digger/planter 2 to penetrate into estuary bottom 18 five to six inches. If estuary bottom 18 is particularly hard additional downward thrust in the direction of arrow 36 can be provided by hydraulic cylinder 32.

Figure 3:
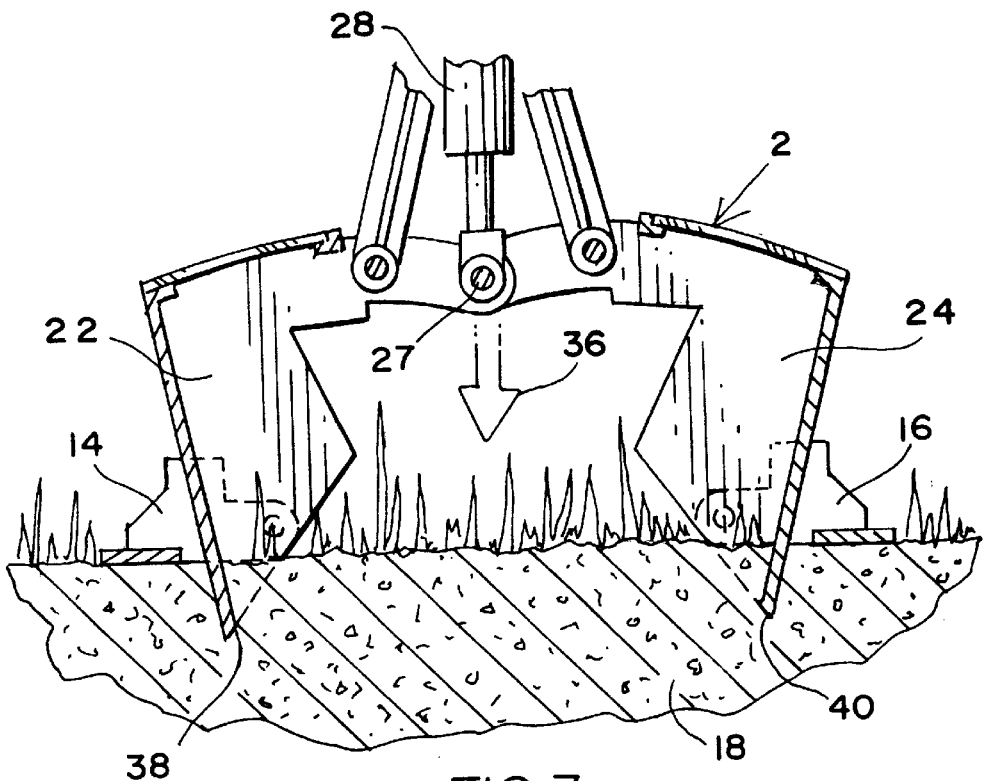
FIG. 3 is a side view showing the sea grass planter in its initial engagement with the estuary bottom.

As is shown in FIG. 3 once leading edges 38 and 40 of primary jaws 22 and 24 have penetrated estuary bottom 18 a slab 20 of sea grass is encompassed.

As can be seen from FIGS. 2–6 primary jaws 22 and 24 of digger/planter 2 further incorporate a pair of secondary jaws 14 and 16. In the initial digging of sea grass slab 20, as is shown in FIG. 3 secondary jaws 14 and 16 are passive.

Figure 4:
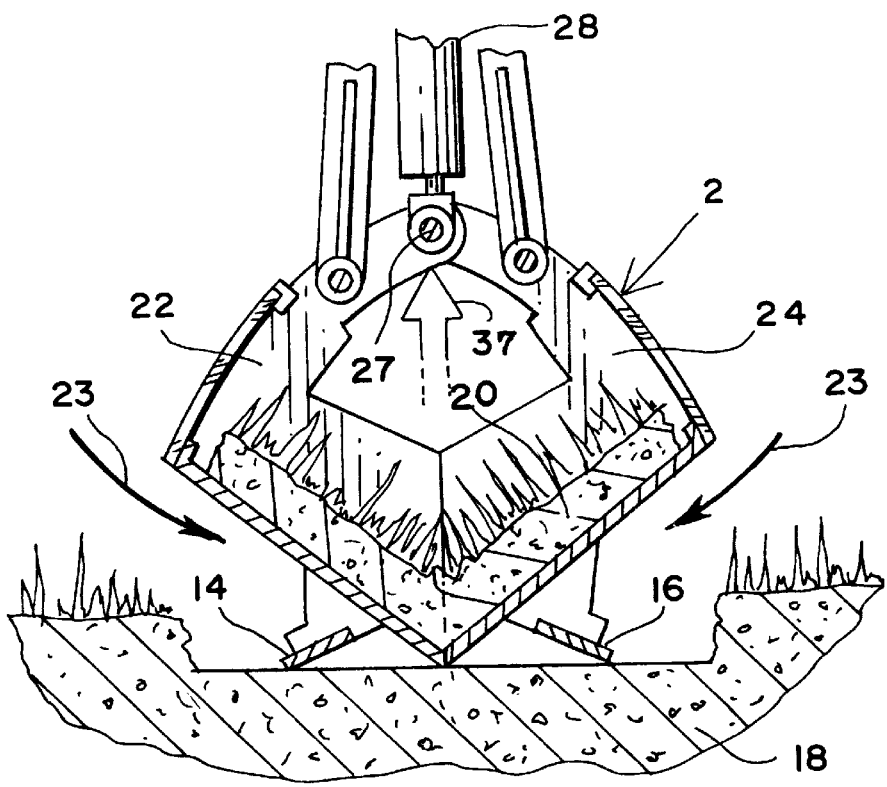
FIG. 4 is a side view showing the sea grass planter removing a slab of sea grass from the estuary bottom.

As is shown in FIG. 4 when primary jaws 22 and 24 are closed, in the direction of arrows 23, via the action of hydraulic cylinder 28 sea grass slab 29 is removed from estuary bottom 18. Again during this sequence secondary jaws 14 and 16 remain passive.

At this stage digger/planter 2, with primary jaws 22 and 24 closed is drawn upward by the action of hydraulic cylinder 32 in the direction of arrow 37. Digger/planter 2 is drawn up on support 4 to such a degree that it clears estuary bottom 18. Preferably digger/planter 2 is drawn up such that its bottom extremities just clear the keels of hulls 10 and 12.

With this placement of digger/planter 2 outboard motors 8 are started and boat 1 is directed to the spot where the sea grass is to be planted.

Figure 5:
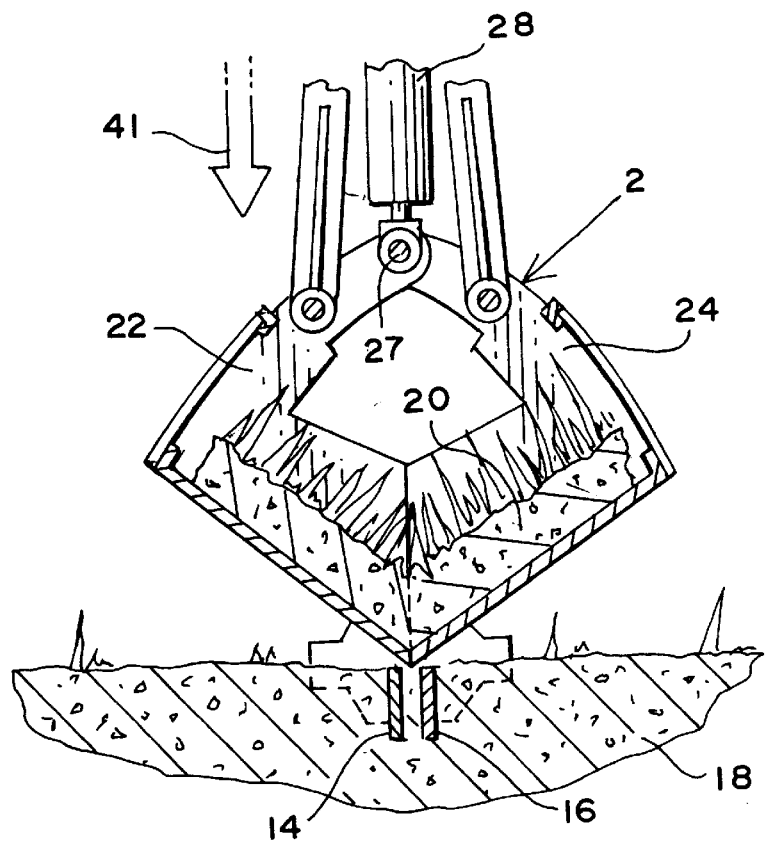
FIG. 5 is a side view showing the initial contact of the sea grass planter with the estuary bottom during the planting sequence.

Referring to FIG. 5 when the composite assembly is positioned over the estuary bottom where slab 20 is to be planted digger/planter 2 is lowered down in the direction of arrow 41.

Prior to lowering digger/planter 2 down secondly jaws 14 and 16 are locked in a vertical stance. Secondly jaws 14 and 16 are no longer passive. As digger/planter 2 is lowered in the direction of arrow 41 secondary jaws 14 and 16 penetrate estuary bottom 18. Under normal circumstances the weight of digger/planter 2 with sea grass slab 20 continued therein is sufficient to cause secondary jaws 14 and 18 to penetrate estuary bottom 18. If estuary bottom 18 is exceptionally hard additional downward thrust to cause secondary jaws 14 and 18 to penetrate estuary bottom can be supplied by hydraulic cylinder 32.

Figure 6:
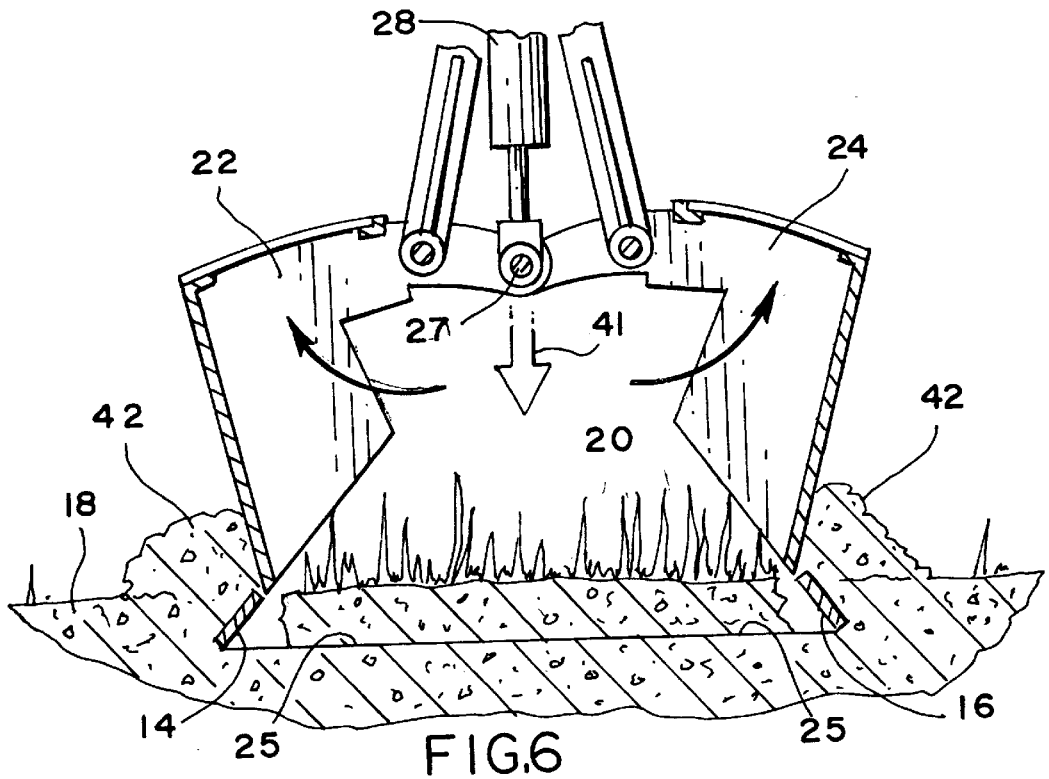
FIG. 6 is a side view showing the sea grass planter in the final stages of planting a slab of sea grass.

Referring to FIGS. 5 and 6 once secondary jaws 14 and 16 have penetrated estuary bottom 18 primary jaws 22 and 24 are caused to open by the action of hydraulic cylinder 28. This opening action causes secondary jaws 14 and 16 which are locked into position to plow a furrow 25 in estuary bottom 18. Rubble 42 is pushed aside as furrow 25 is formed. Rubble 42 is usually quickly dissipated by the action of currents i.e. tidal currents. As furrow 25 is formed sea grass slab 20 falls by the action of gravity.

With the deposit of slab 20 into furrow 25 the planting sequence is completed by drawing digger/planter 2 upward in the direction of arrow 37 by the action of hydraulic cylinder 32. With this upward movement the planting cycle is complete and boat 1 is moved to a location where a new slab of sea grass can be dug and thereafter the planting sequence is repeated.

The unitary process of this invention consist of the following steps:
1. Digging a slab of sea grass;
2. Transporting the slab of sea grass to a new location;
3. With the same apparatus which was used to dig the sea grass slab, dig a furrow and;
4. Deposit the sea grass slab in the formed furrow;

The above description and drawings are illustrative of modifications that can be made without departing from the present invention, the scope of which is to be limited only by the following claims.

What is claimed is:

1. A process for transplanting a plurality of sea grass plants in a unitary operation which comprises the steps of:
   a. with a bucket having a first and second set of digging jaws, with said first set of jaws digging a slab of sea grass, which contains a plurality of sea grass plants,
   b. transporting the slab sea grass to a predetermined location,
   c. with the second set of jaws dig a furrow while the slab of sea grass is contained in the bucket and,
   d. depositing the slab of sea grass in the furrow.

2. The process of claim 1 wherein the process is carried out on a vehicle which is floating on the surface of the water as may be contained in a estuary.

3. The process of claim 2 wherein the vehicle is a bihulled boat.

4. The process of claim 2 wherein the vehicle is a barge.

5. The process of claim 1 wherein the apparatus which is used to dig the sea grass slab and the furrow is a clam shell bucket having a pair of primary jaws which are used to dig the sea grass slab and associated with said primary jaws is a pair of secondary jaws which are used to dig the furrow.

6. The process of claim 2 wherein the apparatus which is used to dig the sea grass slab and the furrow is a clam shell bucket having a pair of primary jaws which are used to dig the sea grass slab and associated with said primary jaws is a pair of secondary jaws which are used to dig the furrow.

7. The process of claim 3 wherein the apparatus which is used to dig the sea grass slab and the furrow is a clam shell bucket having a pair of primary jaws which are used to dig the sea grass slab and associated with said primary jaws is a pair of secondary jaws which are used to dig the furrow.

8. The process of claim 4 wherein the apparatus which is used to dig the sea grass slab and the furrow is a clam shell bucket having a pair of primary jaws which are used to dig the sea grass slab and associated with said primary jaws is a pair of secondary jaws which are used to dig the furrow.

9. The process of claim 1 wherein the sea grass slab falls into the furrow as the furrow is dug.

10. The process of claim 2 wherein the sea grass slab falls into the furrow as the furrow is dug.

11. The process of claim 3 wherein the sea grass slab falls into the furrow as the furrow is dug.

12. The process of claim 4 wherein the sea grass slab falls into the furrow as the furrow is dug.

13. The process of claim 5 wherein the sea grass slab falls into the furrow as the furrow is dug.

14. The process of claim 6 wherein the sea grass slab falls into the furrow as the furrow is dug.

15. The process of claim 7 wherein the sea grass slab falls into the furrow as said slab is dug.

16. The process of claim 8 wherein the sea grass slab falls into the furrow as it is dug.

17. A digger/planter for sea grass slabs in water comprising a floatable platform which has access to the surface of the water, a support positioned approximate said access, a digger/planter attached to said support, means attached to said support and to the digger/planter which allows the vertical movement of said digger/planter through the access, said digger/planter having a pair of primary jaws which are adapted to digging a slab of sea grass, approximate said primary jaws are a pair of secondary jaws which are adapted to engage the estuary bottom and digging a furrow in said estuary bottom.

* * * * *